(12) United States Patent
Ishikawa et al.

(10) Patent No.: US 7,703,690 B2
(45) Date of Patent: Apr. 27, 2010

(54) NON-CONTACT IC APPARATUS AND CONTROL METHOD

(75) Inventors: Hidetoshi Ishikawa, Yokohama (JP); Koji Chiba, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 979 days.

(21) Appl. No.: 11/415,200

(22) Filed: May 2, 2006

(65) Prior Publication Data
US 2007/0257117 A1 Nov. 8, 2007

(30) Foreign Application Priority Data
Jun. 9, 2005 (JP) ............................. 2005-169730

(51) Int. Cl.
*G06K 19/06* (2006.01)
(52) U.S. Cl. ...................... 235/492; 235/380
(58) Field of Classification Search ................. 235/380, 235/492
See application file for complete search history.

(56) References Cited

U.S. PATENT DOCUMENTS

2003/0181229 A1  9/2003  Forster et al.
2004/0039749 A1  2/2004  Yokozawa

FOREIGN PATENT DOCUMENTS

| CN | 1096655 C | 12/2002 |
|---|---|---|
| EP | 0 779 598 A2 | 6/1997 |
| EP | 1 083 622 A2 | 3/2001 |
| EP | 1 308 886 A2 | 5/2003 |
| JP | 10-291392 | 11/1998 |
| JP | 11-129659 | 5/1999 |
| JP | 2001-101370 | 4/2001 |
| JP | 2001-175828 | 6/2001 |
| JP | 2002-251593 | 9/2002 |
| JP | 2003-331238 | 11/2003 |
| JP | 2005-11009 | 1/2005 |
| KR | 10-2004-0025620 | 3/2004 |

*Primary Examiner*—Michael G Lee
*Assistant Examiner*—Kristy A Haupt
(74) *Attorney, Agent, or Firm*—Oblon, Spivak, McClelland, Maier & Neustadt, L.L.P.

(57) ABSTRACT

A non-contact IC apparatus is provided in a simple configuration with a plurality of IC chips, while enabling reliable communication. A non-contact IC apparatus 1 has a plurality of IC chips 30, 50, an antenna 11 for receiving a radio wave for non-contact IC apparatus, a modem part 12 for acquiring a signal from the radio wave received by the antenna 11, and a distribution control part 13 for selecting an IC chip to receive the signal, out of the plurality of IC chips 30, 50, based on the signal acquired by the modem part 12, and for transmitting the signal to the selected IC chip.

15 Claims, 6 Drawing Sheets

NON-CONTACT IC APPARATUS AND CONTROL METHOD

BACKGROUND OF THE INVENTION

1. Field of the Invention

The present invention relates to a non-contact IC apparatus and a control method in the non-contact IC apparatus.

2. Related Background of the Invention

There are conventional non-contact IC (Integrated Circuit) cards configured to perform communication with a reader/writer by radio wave (which are also called Smart Cards outside Japan). The above is described, for example, in Japanese Patent Application Laid-Open No. JP-A2005-11009. The non-contact IC cards are used in various places, for example, in such a manner that a value such as electronic money, information for authentication, or the like is stored therein.

SUMMARY OF THE INVENTION

A non-contact IC card is a card that implements the function of storage and processing of information by an IC chip mounted thereon. From the viewpoint of convenience, there are desires for achieving a plurality of functions by a single IC card (medium). The inclusion of multiple functions (e.g., the function of ATM card and the function of credit card) in a single IC chip is sometimes considered to raise a security problem because these functions are normally provided by different providers and because issuers of IC cards can also be different from each other (e.g., a bank and a credit company). To begin with, there are cases where it is impossible to put multiple functions in a single IC chip because providers of the functions adopt different systems for IC chips.

It can thus be contemplated that a single IC card is loaded with a plurality of IC chips and antennas corresponding to the respective IC chips, in order to realize the multiple functions by the single IC card. However, where the plurality of antennas are mounted corresponding to the respective IC chips, there will arise a problem that interference of radio waves occurs between the antennas to make communication difficult. When the plurality of antennas are mounted, there is another problem that the configuration of the IC card becomes complicated.

The present invention has been accomplished in order to solve the above problems, and an object of the invention is to provide a non-contact IC apparatus and a control method in a simple configuration with a plurality of IC chips, while enabling reliable communication.

A non-contact IC apparatus according to the present invention comprises: a plurality of IC chips; an antenna for receiving a radio wave for non-contact IC apparatus; signal acquiring means for acquiring a signal from the radio wave received by the antenna; and distribution controlling means for selecting an IC chip to receive the signal, out of the plurality of IC chips, based on the signal acquired by the signal acquiring means, and for transmitting the signal to the selected IC chip.

In the non-contact IC apparatus of the present invention, a radio wave for non-contact IC apparatus is received by the single antenna no matter which IC chip is an object for communication. The non-contact IC apparatus is configured to acquire a signal from the received radio wave, to select an IC chip to receive the signal, based on the signal, and to transmit the signal. Therefore, the non-contact IC apparatus of the present invention is able to prevent the interference of radio waves due to provision of a plurality of antennas for non-contact IC apparatus, and thus to perform reliable communication. Since the single antenna for non-contact IC apparatus suffices in the non-contact IC apparatus, the non-contact IC apparatus can be substantialized in a simple configuration.

Another non-contact IC apparatus according to the present invention comprises: a mounting portion on which a plurality of IC chips can be mounted; an antenna for receiving a radio wave for non-contact IC apparatus; signal acquiring means for acquiring a signal from the radio wave received by the antenna; and distribution controlling means for selecting an IC chip to receive the signal, out of a plurality of IC chips mounted on the mounting portion, based on the signal acquired by the signal acquiring means, and for transmitting the signal to the selected IC chip. According to this configuration, the non-contact IC apparatus with a plurality of IC chips detachably mounted is also able to perform reliable communication and to substantialize the simple configuration.

Preferably, the signal acquired by the signal acquiring means is an analog signal, and the distribution controlling means performs the selecting, based on a waveform of the analog signal. This configuration permits the present invention to be readily carried out, for example, in cases where systems of analog signals are different among the IC chips.

Preferably, the signal acquired by the signal acquiring means is a digital signal, and the distribution controlling means performs the selecting, based on the digital signal. This configuration permits the present invention to be readily carried out, for example, in cases where character strings of header information obtained as digital signals are different among the IC chips.

Incidentally, the present invention can be described as the invention of the non-contact IC apparatus as described above, and can also be described as the invention of a control method in the non-contact IC apparatus as described below. It is different only in its category and is substantially the same invention, with like action and effect.

A control method according to the present invention is a control method in a non-contact IC apparatus comprising a plurality of IC chips, and an antenna for receiving a radio wave for non-contact IC apparatus, the method comprising: a reception step of receiving a radio wave for non-contact IC apparatus by the antenna; a signal acquisition step of acquiring a signal from the radio wave received in the reception step; and a distribution control step of selecting an IC chip to receive the signal, out of the plurality of IC chips, based on the signal acquired in the signal acquisition step, and of transmitting the signal to the selected IC chip.

The present invention enables the apparatus and method to prevent the interference of radio waves due to the provision of multiple antennas for non-contact IC apparatus, and to perform reliable communication. In addition, since only one antenna for non-contact IC apparatus suffices in the non-contact IC apparatus, the non-contact IC apparatus can be substantialized in a simple configuration.

DESCRIPTION OF THE PREFERRED EMBODIMENTS

The preferred embodiments of the non-contact IC apparatus and the control method in the non-contact IC apparatus according to the present invention will be described below in detail with the drawings. In the description of the drawings the same elements will be denoted by the same reference symbols, without redundant description. It is noted that the dimensional ratios in the drawings do not always agree with those in the description.

Figure 1:
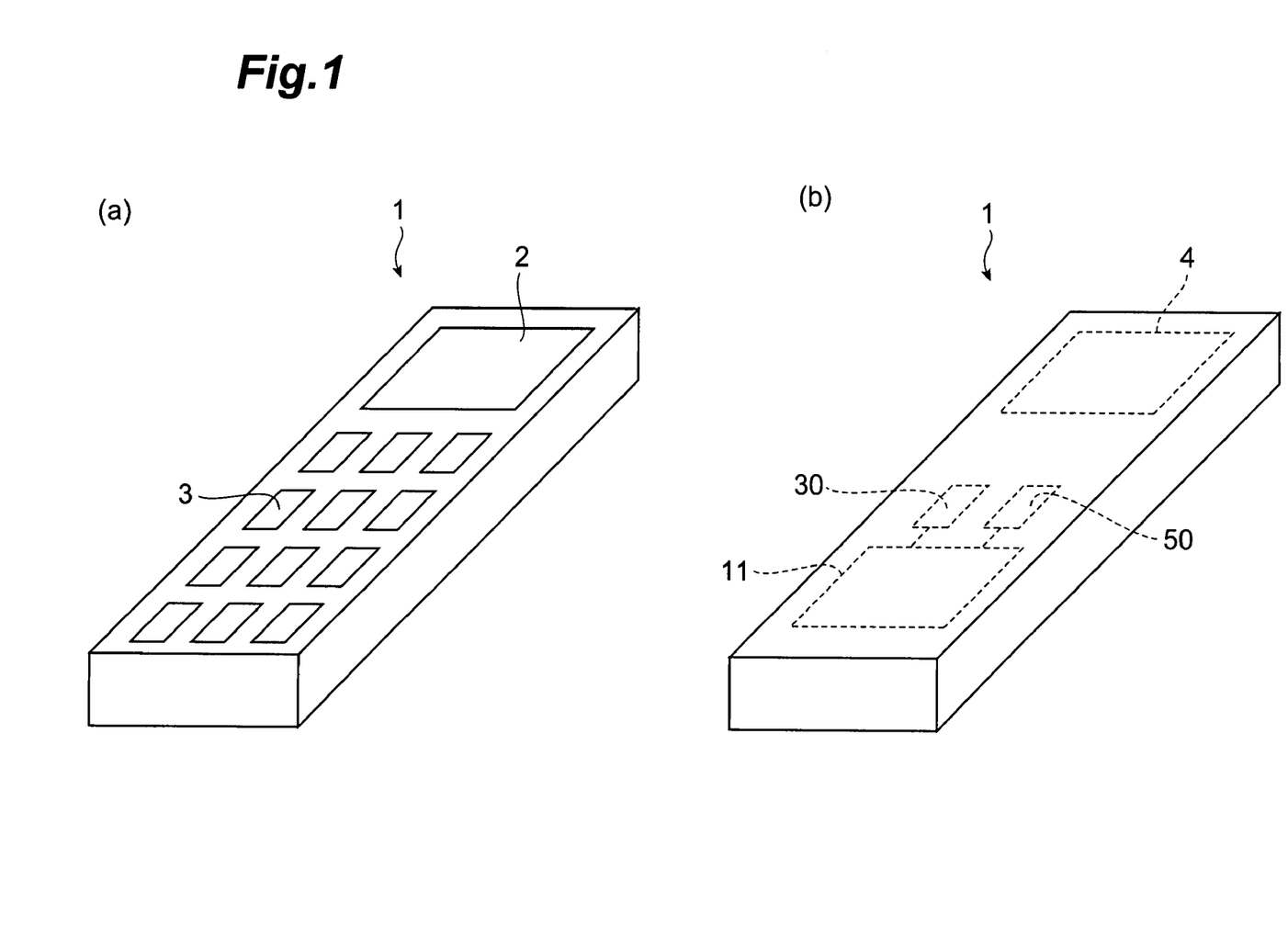
FIG. 1 is an illustration showing the appearance of a cell phone being a non-contact IC apparatus according to an embodiment of the present invention.

FIG. 1 shows the appearance of a cell phone (mobile equipment) being a non-contact IC apparatus 1 according to the present embodiment. The non-contact IC apparatus 1 has functions as a cell phone. For this reason, the non-contact IC apparatus 1, as shown in FIG. 1(a), is provided with a display part 2, an operation part 3, etc. for the functions of the cell phone. The non-contact IC apparatus 1, as shown in FIG. 1(b) which is the back side opposite to the side shown in FIG. 1(a), is provided with an antenna 4 for mobile communication. The non-contact IC apparatus 1 incorporates hardware devices such as a CPU (Central Processing Unit), memories, and a communication module (not shown), and implements the functions of the cell phone in combination with the aforementioned components.

The non-contact IC apparatus 1 has functions as a non-contact IC apparatus. For this reason, the non-contact IC apparatus 1 is provided with an antenna 11 for transmitting and receiving radio waves for non-contact IC apparatus, and two IC chips 30, 50, as shown in FIG. 1(b), in order to implement the functions of the non-contact IC apparatus. The aforementioned display part 2, operation part 3, CPU, memories, etc. are sometimes shared as hardware for implementing the functions of the non-contact IC apparatus, as well as the hardware for the functions of the cell phone.

The radio waves for non-contact IC apparatus are radio waves used in communication between the non-contact IC apparatus, such as non-contact IC cards, and a reader/writer for non-contact IC apparatus, and, specifically, they are waves with the communication range of approximately several mm to several ten cm and with the frequency of several MHz to several GHz. They are defined by the International Standards, e.g., ISO14443. Non-contact IC interfaces for non-contact IC apparatus are different in the modulation method, protocol, etc. among types of IC chips (e.g., Type A and Type B specified in ISO14443).

The antenna 11 for non-contact IC apparatus is substantialized, for example, by burying a conductor of coil shape in the non-contact IC apparatus 1, as shown in FIG. 1(b). For designing the antenna 11, it is necessary to realize antenna arrangement necessary and to secure a sufficient area of an antenna surface for enabling appropriate radio communication in each operation mode thereof (whether the antenna has to be kept in complete contact with a device such as a reader/writer for non-contact IC apparatus, or whether it can be located at some distance from the device). At this time, it is also necessary to give consideration to whether the IC chips 30, 50 use an electromotive force by electromagnetic induction obtained from the antenna 11 for non-contact IC apparatus (passive IC apparatus), or whether the IC chips 30, 50 use a power supplied from the non-contact IC apparatus 1 itself (a battery or the like thereof) (active IC apparatus).

The IC chips 30, 50, as shown in FIG. 1(b), are built in the non-contact IC apparatus 1. The IC chips 30, 50 may also be arranged to be detachably mounted on the non-contact IC apparatus 1. In that case, an interface being a mounting portion on which the IC chips 30, 50 can be mounted is prepared in the non-contact IC apparatus 1. The interface can be selected, for example, from the UIM (User Identity Module) interface, the USB (Universal Serial Bus) interface, and other interfaces for external equipment. A specific interface on the IC chip 30, 50 side may use, for example, the electric contacts specified in ISO7816 Part 2 (e.g., terminal C4 and terminal C8 being RFU (Reserve for Future Use)), or dedicated electric contacts provided at different positions.

Specific examples of the IC chips 30, 50 include UIMs, SD cards (Secure Digital memory cards), MMCs (MultiMedia Cards), memory sticks, and so on. The IC chips 30, 50 are loaded with their respective functions as the non-contact IC apparatus. The functions include, for example, the function of individual identification and authentication such as admission cards and employee ID cards, the function of traffic ticket and commuter pass, the function of credit card, the function of electronic money, and so on.

The antenna 11 and IC chips 30, 50, when mounted on a cell phone as in the present embodiment, are preferably arranged at positions where the impact is minimum on radio communication with a base station for mobile communication to and from which the cell phone transmits and receives radio waves. Specifically, the antenna 11 and IC chips 30, 50 are preferably located as far as possible from the antenna 4 for mobile communication, as shown in FIG. 1(b). If the cell phone is not arranged only for mobile communication but is also equipped with a wireless communication device of Bluetooth or the like, the antenna 11 and IC chips 30, 50 should be located at positions where no mutual interference occurs with such communications.

In the non-contact IC apparatus 1 of the present embodiment, the IC chips 30, 50 have their respective functions different between the IC chips 30, 50 as described above. The non-contact IC apparatus 1 is configured to control those functions so as to act appropriately, and can adopt a plurality of implementation methods as described in each of embodiments below. Each of the embodiments will be described below.

First Embodiment

Figure 2:
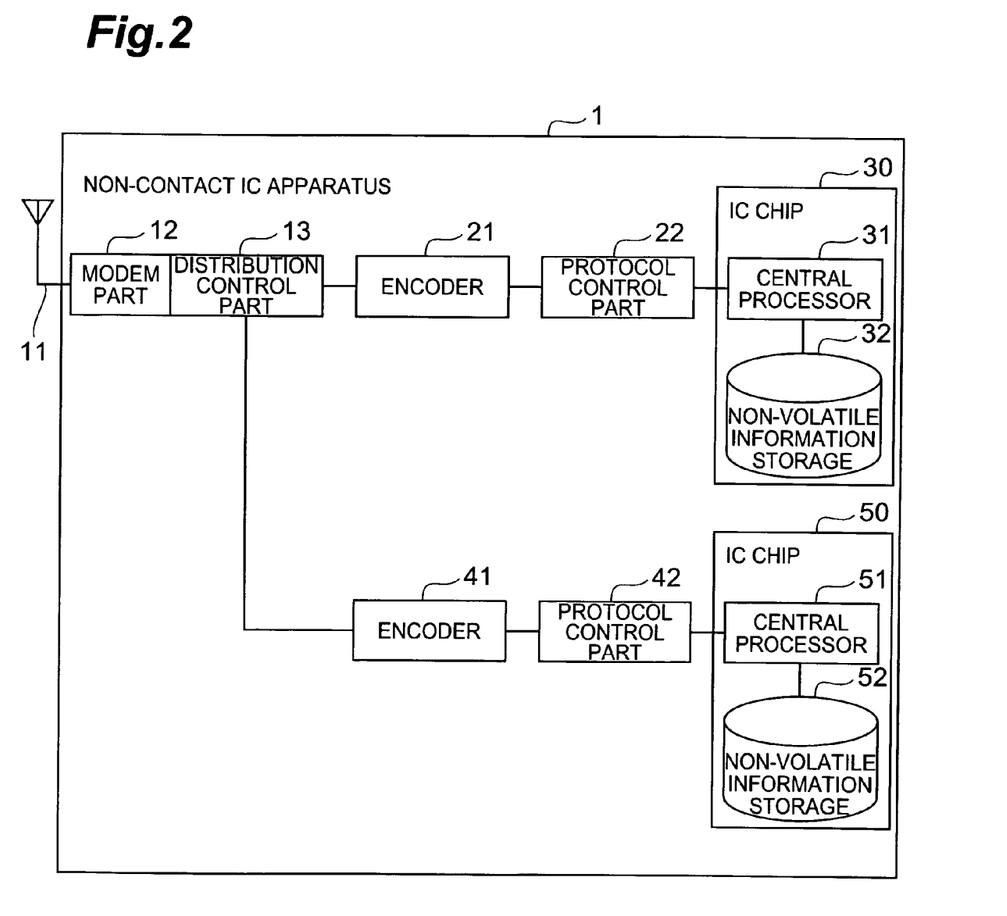
FIG. 2 is a functional block diagram of a non-contact IC apparatus according to the first embodiment of the present invention.

FIG. 2 shows a functional configuration of non-contact IC apparatus 1 as a non-contact IC apparatus in the first embodiment. The functional configuration of the non-contact IC apparatus 1 as a cell phone is omitted herein. As shown in FIG. 2, the non-contact IC apparatus 1 has an antenna 11 and two IC chips 30, 50 as described above, and, in addition thereto, it has a modem part 12, a distribution control part 13, and encoders 21, 41 and protocol control parts 22, 42 corresponding to the two IC chips 30, 50, respectively. Each of the IC chips 30, 50 is provided with a central processor 31, 51 and a non-volatile information storage 32, 52. These functional components are implemented, for example, by the aforementioned CPU of the non-contact IC apparatus 1, electric circuit for realizing the functions of the respective components, and so on.

The modem part 12 is a part that demodulates a radio wave received by the antenna 11, into an analog signal. Namely, the modem part 12 is a signal acquiring means for acquiring an analog signal from a radio wave received by the antenna 11. The analog signal acquired by the modem part 12 is transmitted to the distribution control part 13. The modem part 12 is specifically composed of an electric circuit or the like. The modem part 12 also performs modulation of an analog signal into a radio wave.

The distribution control part 13 is a distribution controlling means for selecting an IC chip to receive an analog signal, out of a plurality of IC chips 30, 50, based on the analog signal acquired by the modem part 12, and for transmitting the analog signal to the selected IC chip. For the foregoing selection, the distribution control part 13 preliminarily holds information about patterns of analog waveforms due to the difference between radio wave systems of the IC chips 30, 50. The distribution control part 13 compares a waveform of the analog signal acquired by the modem part 12, with the patterns of the analog waveforms thus held, to implement the selection of the IC chip. More specifically, it will be described in the description of processing in the non-contact IC apparatus 1. The analog signal acquired by the modem part 12 is transmitted to the encoder 21, 41 corresponding to the selected IC chip 30, 50.

The encoder 21, 41 converts the analog signal transmitted from the distribution control part 13, into a digital signal (A/D conversion), and transmits the digital signal to the protocol control part 22, 42.

The protocol control part 22, 42 is a termination portion of an information transfer protocol with the IC chip 30, 50, and transmits the digital signal received from the encoder 21, 41, to the corresponding IC chip 30, 50.

The central processor 31, 51 of the IC chip 30, 50 receives the digital signal transmitted from the protocol control part 22, 42 to the IC chip 30, 50, and performs the processing of the function according to the IC chip 30, 50, e.g., arithmetic operation or the like. The central processor 31, 51 also includes a temporary storage place (memory) for arithmetic operation. In the case where the IC chips 30, 50 are detachably arranged as described above, the input into the part of IC chip 30, 50 is preferably the digital signal as described above. If the input is an analog signal, it will be difficult for the IC chip 30, 50 to absorb variation of signals due to the analog characteristics, for example, in cases where the IC chips 30, 50 are used as replaced one from another.

The non-volatile information storage 32, 52 is a file system in a non-volatile memory in the IC chip 30, 50. The non-volatile information storage 32, 52 stores information according to the function of IC chip 30, 50, and is subjected to referencing, writing, etc. as occasion demands in the arithmetic operation or the like by the central processor 31, 51. Specific examples of the information to be stored in the non-volatile information storage 32, 52 include individual identification-authentication information such as an admission card or employee ID card, information of a traffic ticket or commuter pass, information of a credit card, information of electronic money, and so on.

Figure 3:
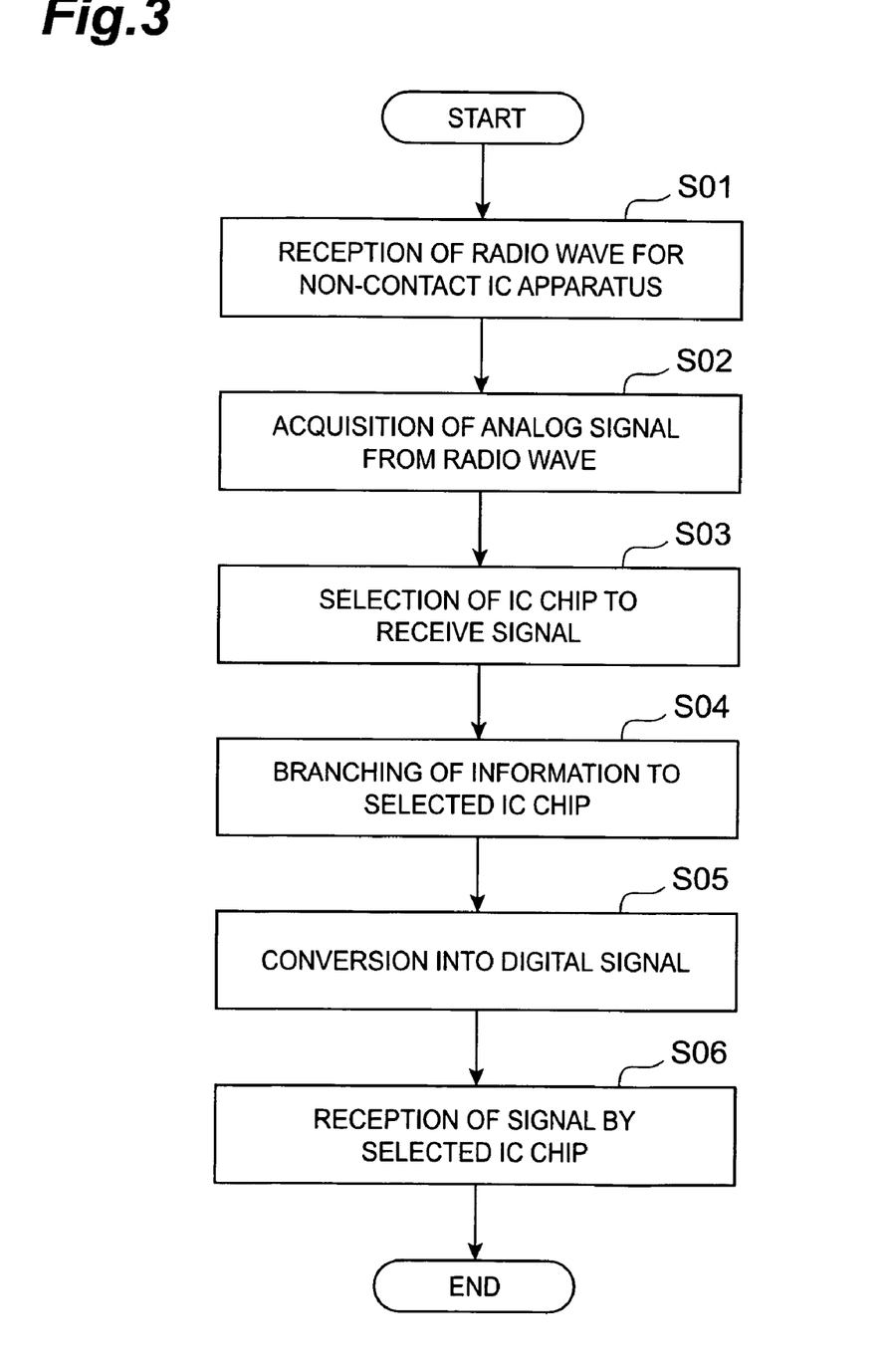
FIG. 3 is a flowchart of a control method in the non-contact IC apparatus according to the first embodiment of the present invention.

Subsequently, a process (control method) executed by the non-contact IC apparatus 1 in the present embodiment will be described below with reference to the flowchart of FIG. 3. This process is a process in receiving a radio wave from a device such as a reader/writer for non-contact IC apparatus.

First, in the non-contact IC apparatus 1 the antenna 11 receives a radio wave for non-contact IC apparatus (S01, reception step). The acquisition of the radio wave is implemented, for example, when a user brings the non-contact IC apparatus 1 to near a device such as a reader/writer for non-contact IC apparatus and when the non-contact IC apparatus 1 is located within the range of the device to detect the radio wave by polling.

Subsequently, the modem part 12 acquires an analog signal by converting the radio wave received by the antenna 11 (S02, signal acquisition step). The acquired analog signal is transmitted to the distribution control part 13.

Then the distribution control part 13 selects an IC chip to receive the analog signal, out of the plurality of IC chips 30, 50, based on the analog signal thus acquired (S03, distribution control step). The above selection is carried out, for example, as follows. As a specific example, let us describe a case where the IC chip 30 conforms to Type A specified in ISO14443 and where the IC chip 50 conforms to Type B specified in ISO14443.

Figure 4:
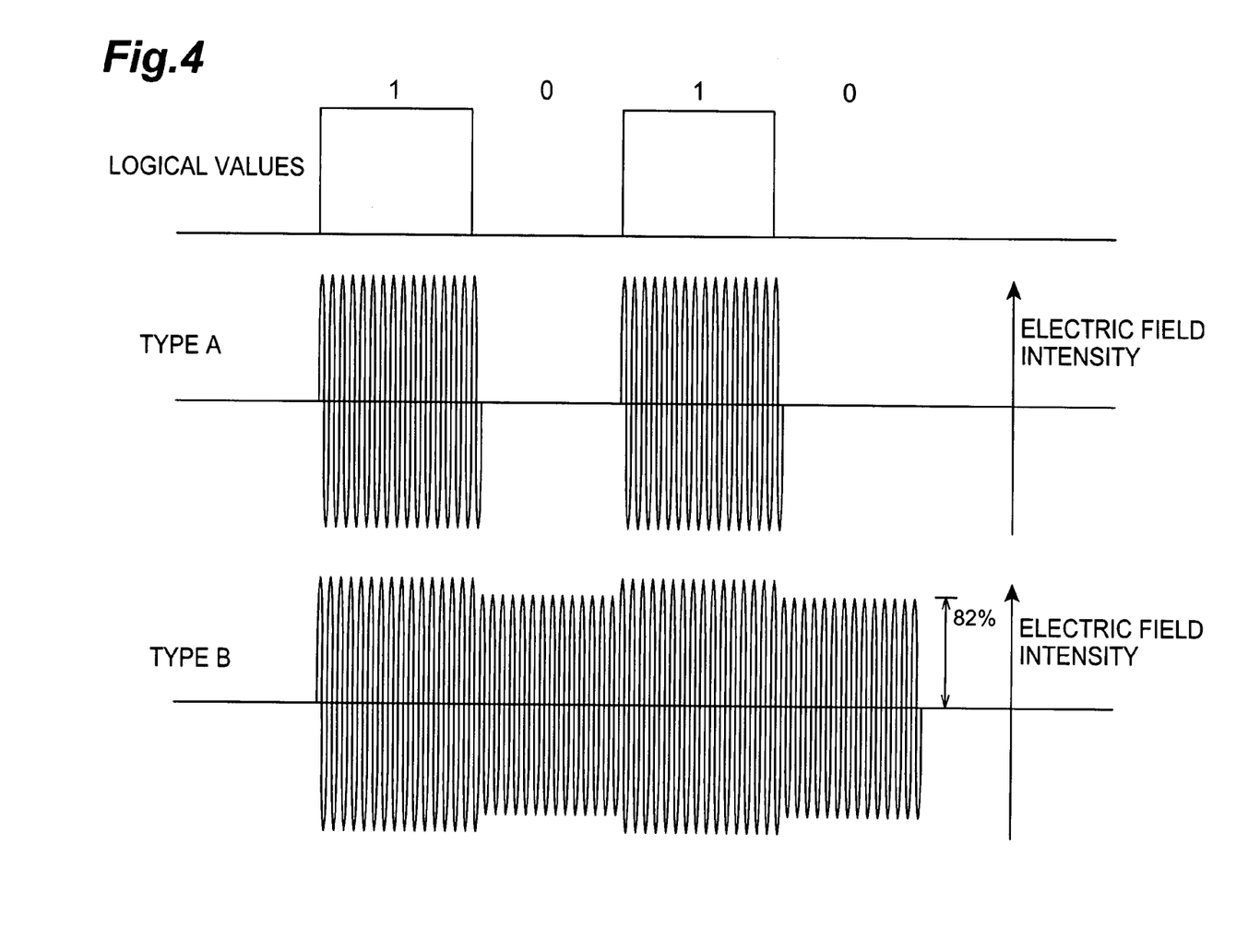
FIG. 4 is an illustration showing analog signals in respective systems of IC chips.

Type A and Type B adopt different modulation systems of signals. Type A is ASK (Amplitude Shift Keying) 100%, and Type B is ASK 10%. ASK 100% and ASK 10% indicate that the difference between electric field intensities of analog signals corresponding to the difference between logical values "1" and "0" of digital signals is 100% or 10%, respectively, of the electric field intensity for the indication of "1." Namely, as shown in FIG. 4, the logical value "0" in Type A corresponds to a sine wave with the electric field intensity equal to 0% of the electric field intensity for "1", while the logical value "0" in Type B corresponds to a sine wave with the electric field intensity equal to 82% of the electric field intensity for "1." FIG. 4 is an image of carrier waves of radio waves with the carrier frequency of 13.56 MHz.

In the case of the above example, the distribution control part 13 preliminarily holds the information about the ASK for each of the IC chips 30, 50, and determines to which IC chip 30, 50 (modulation system) the analog signal acquired corresponds, with reference to the information thus held. The aforementioned selection of the IC chip is carried out based on this determination.

Subsequently, the distribution control part 13 transmits the analog signal to the encoder 21, 41 corresponding to the selected IC chip 30, 50 (S04, distribution control step). The encoder 21, 41, receiving the analog signal, performs A/D conversion of the analog signal to obtain a digital signal (S05). The encoder 21, 41 transmits the digital signal to the corresponding protocol control part 22, 42.

The protocol control part 22, 42 performs the processing about the protocol, necessary for transmission of the digital signal to the IC chip 30, 50, and transmits the digital signal to the corresponding IC chip 30, 50. The IC chip 30, 50 as a target of the transmission of the digital signal receives the digital signal (S06). The IC chip 30, 50 performs the arithmetic operation or the like on the digital signal according to the function of its own. On that occasion, the IC chip 30, 50 references the information stored in the non-volatile information storage 32, 52 as occasion demands. The above described the configuration of non-contact IC apparatus 1 and the processing (control method) in the non-contact IC apparatus 1 in the first embodiment.

Second Embodiment

Figure 5:
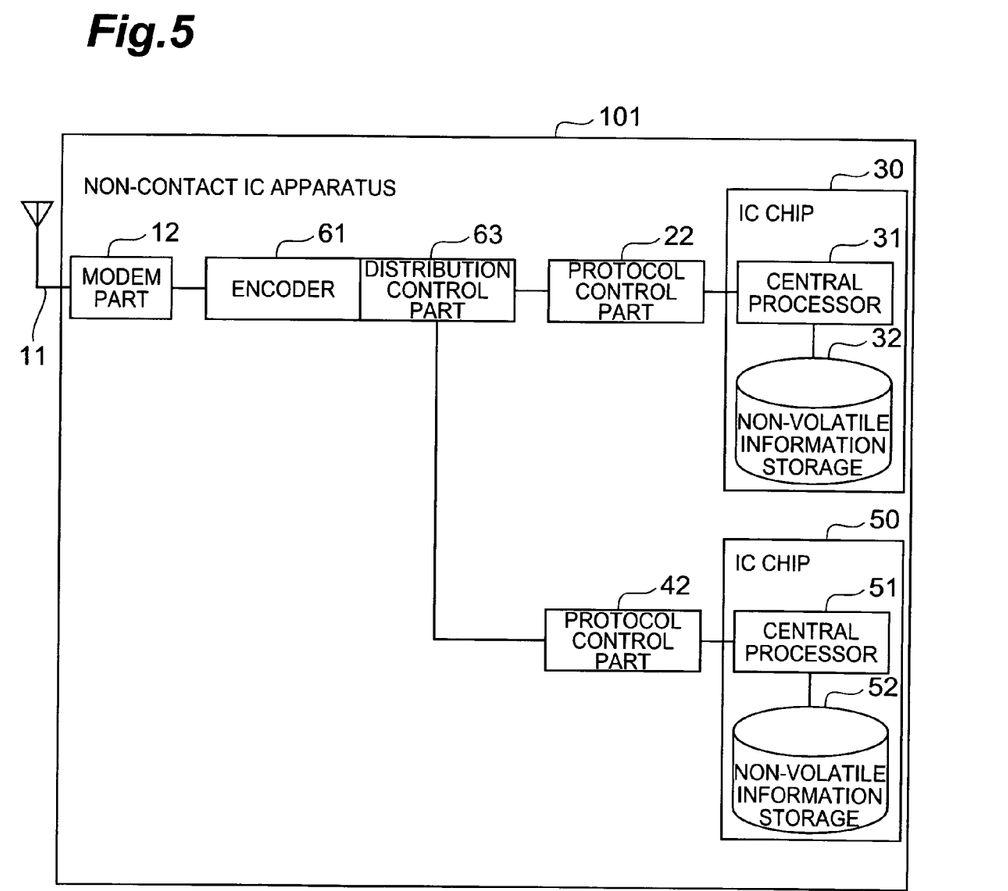
FIG. 5 is a functional block diagram of a non-contact IC apparatus according to the second embodiment of the present invention.

FIG. 5 shows a functional configuration of another non-contact IC apparatus 101 as a non-contact IC apparatus in the second embodiment. The non-contact IC apparatus 101 is constructed in the same configuration as the non-contact IC apparatus 1 of the first embodiment, except for the portions described in particular. As shown in FIG. 5, the non-contact IC apparatus 101 has an antenna 11 and two IC chips 30, 50 and, in addition thereto, it has a modem part 12, an encoder 61, a distribution control part 63, and protocol control parts 22, 42 corresponding to the two IC chips 30, 50, respectively. These functional components are implemented, for example, by the aforementioned CPU of the non-contact IC apparatus 101, electric circuits for implementing the functions of the respective components, and so on.

The modem part 12 has the same function as the modem part 12 in the first embodiment. An analog signal acquired by the modem part 12 is transmitted to the encoder 61.

The encoder 61 converts the analog signal transmitted from the modem part 12, into a digital signal (A/D conversion) and transmits the digital signal to the distribution control part 63. Namely, the encoder 61 is a signal acquiring means for acquiring a digital signal from a radio wave received by the antenna. The encoder 61 in the present embodiment is not provided for each of the IC chips 30, 50, but may include at least one provided before the distribution control part 63.

The distribution control part 63 is a distribution controlling means for selecting an IC chip to receive the digital signal, out of the plurality of IC chips 30, 50, based on the digital signal acquired by the encoder 61, and for transmitting the digital signal to the selected IC chip. For the foregoing selection, the distribution control part 63 preliminarily holds the information about patterns of digital signals due to the difference between data systems for the respective IC chips 30, 50. The distribution control part 63 compares the digital signal acquired by the encoder 61, with the patterns of digital signals thus held, to perform the selection of the IC chip. More specifically, it will be described in the description of processing in the non-contact IC apparatus 101. The analog signal acquired by the encoder 61 is transmitted to the protocol control part 22, 42 corresponding to the selected IC chip 30, 50.

The protocol control part 22, 42 transmits the digital signal received from the distribution control part 63, to the corresponding IC chip 30, 50.

Figure 6:
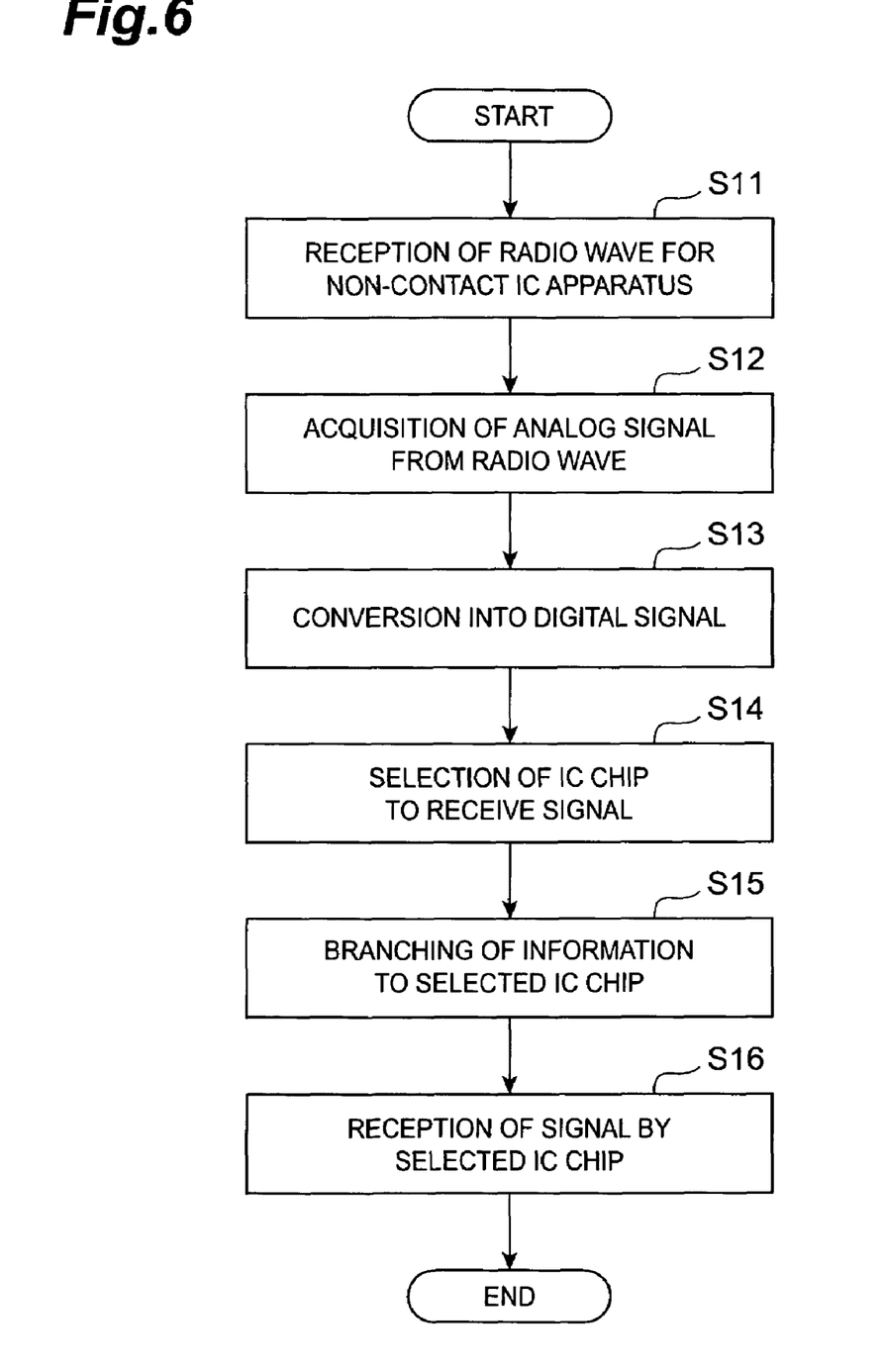
FIG. 6 is a flowchart of a control method in the non-contact IC apparatus according to the second embodiment of the present invention.

Subsequently, a process (control method) executed by the non-contact IC apparatus 101 in the present embodiment will be described below using the flowchart of FIG. 6. This process is a process in receiving a radio wave from a device such as a reader/writer for non-contact IC apparatus.

First, in the non-contact IC apparatus 101 the antenna 11 receives a radio wave for non-contact IC apparatus in the same manner as in the first embodiment (S11, reception step). Subsequently, the modem part 12 converts the radio wave received by the antenna 11, to acquire an analog signal (S12, signal acquisition step). The acquired analog signal is transmitted to the encoder 61.

Subsequently, the encoder 61, receiving the analog signal, performs A/D conversion of the analog signal to obtain a digital signal (S13, signal acquisition step). The encoder 61 transmits the digital signal to the distribution control part 63.

Then the distribution control part 63 selects an IC chip to receive the digital signal, out of the plurality of IC chips 30, 50, based on the acquired digital signal (S14, distribution control step). The above selection can be performed, for example, by acquiring the header information from the digital signal and making a determination with reference to a character string included in the header information. In that case, the distribution control part 63 preliminarily stores the correspondence between the types of IC chips 30, 50 and character strings. Any information other than the character strings in the header information, which is different between the IC chips 30, 50, may be used.

Subsequently, the distribution control part 63 transmits the analog signal to the protocol control part 22, 42 corresponding to the selected IC chip 30, 50 (S15, distribution control step). The protocol control part 22, 42 performs the processing about the protocol, necessary for transmission of the digital signal to the IC chip 30, 50, and transmits the digital signal to the corresponding IC chip 30, 50. The IC chip 30, 50 as a target of the transmission of the digital signal receives the digital signal (S16). The above described the configuration of non-contact IC apparatus 101 and the process (control method) in the non-contact IC apparatus 101 in the second embodiment.

As described above, the non-contact IC apparatus 1, 101 of the embodiments of the present invention may be constructed with one antenna 11 (for non-contact IC apparatus), and it is able to prevent the interference of radio waves due to provision of a plurality of antennas for non-contact IC apparatus and to perform reliable communication. In addition, since only one antenna 11 suffices, the non-contact IC apparatus can be substantialized in the simple configuration.

When the non-contact IC apparatus 1, 101 is constructed as a cell phone as in the embodiments of the present invention, it is feasible to enhance the functions of the cell phone and to improve the convenience of the cell phone for the user.

With the non-contact IC apparatus 1, 101 of the embodiments of the present invention, the user does not have to perform any operation for enabling use of the plurality of IC chips 30, 50. Therefore, there is no possibility of malfunction of the non-contact IC apparatus 1, 101 due to user's erroneous operation and the apparatus operates with certainty. It is also possible to operate the non-contact IC apparatus 1, 101 with the plurality of IC chips 30, 50 even in cases where the user is unable to perform manipulation in the first place (e.g., a case where it is difficult for the user to perform manipulation, including physical conditions).

By adopting the configuration wherein the IC chip to receive the signal is selected based on the analog signal as in the non-contact IC apparatus 1 of the first embodiment, the present invention can be carried out readily and securely in cases where the systems of analog signals are different between the IC chips 30, 50 as in the first embodiment.

By adopting the configuration wherein the IC chip to receive the signal is selected based on the digital signal as in the non-contact IC apparatus 101 of the second embodiment, the present invention can be readily carried out in cases where character strings or the like in the header information obtained as digital signals are different between the IC chips 30, 50 as in the second embodiment.

In the embodiments of the present invention the non-contact IC apparatus 1, 101 was the cell phone, but it may also be any other form, e.g., a non-contact IC card in which an antenna and IC chips are buried. In that case, the non-contact IC card is preferably of the passive type using the electromotive force from the antenna, as in the case of the ordinary cards, in view of portability or the like.

In the embodiments of the present invention the non-contact IC apparatus 1, 101 included two IC chips 30, 50, but the apparatus may include three or more IC chips. In the embodiments of the present invention the two IC chips 30, 50 were constructed as physically separate components, but the present invention can also be applied to cases where one device is equipped with a plurality of circuits to implement the functions of plural IC chips 30, 50.

The embodiments of the present invention described only the reception of radio waves by the non-contact IC apparatus 1, 101, but, preferably, the apparatus is also provided for transmission of radio waves as the non-contact IC apparatus such as the ordinary IC cards is.

What is claimed is:

1. A non-contact IC apparatus comprising:
a plurality of IC chips;
an antenna for receiving a radio wave for non-contact IC apparatus;
signal acquiring means for acquiring a signal from the radio wave received by the antenna; and
distribution controlling means for selecting an IC chip to receive the signal, out of the plurality of IC chips, by comparing a pattern or waveform of the signal acquired by the signal acquiring means to a plurality of stored patterns or waveforms that each correspond to a respective one of the plurality of IC chips, and for transmitting the signal to the selected IC chip.

2. The non-contact IC apparatus according to claim 1, wherein the signal acquired by the signal acquiring means is an analog signal, and the distribution controlling means performs said selecting by comparing a waveform of the analog signal with the plurality of stored waveforms.

3. The non-contact IC apparatus according to claim 2, wherein each of the plurality of stored waveforms corresponds to logical values indicating maximum and minimum field intensities of an analog signal.

4. The non-contact IC apparatus according to claim 1, wherein the signal acquired by the signal acquiring means is a digital signal, and the distribution controlling means performs said selecting by comparing a pattern of the digital signal to the plurality of stored patterns.

5. The non-contact IC apparatus according to claim 4, wherein each of the plurality of stored patterns corresponds to a character string included in a header of a digital signal.

6. A non-contact IC apparatus comprising:
a mounting portion on which a plurality of IC chips can be mounted;
an antenna for receiving a radio wave for non-contact IC apparatus;
signal acquiring means for acquiring a signal from the radio wave received by the antenna; and
distribution controlling means for selecting an IC chip to receive the signal, out of a plurality of IC chips mounted on the mounting portion, by comparing a pattern or waveform of the signal acquired by the signal acquiring means to a plurality of stored patterns or waveforms that each correspond to a respective one of the plurality of IC chips, and for transmitting the signal to the selected IC chip.

7. The non-contact IC apparatus according to claim 6, wherein the signal acquired by the signal acquiring means is an analog signal, and the distribution controlling means performs said selecting by comparing a waveform of the analog signal to the stored plurality of waveforms.

8. The non-contact IC apparatus according to claim 7, wherein each of the plurality of stored waveforms corresponds to logical values indicating maximum and minimum field intensities of an analog signal.

9. The non-contact IC apparatus according to claim 6, wherein the signal acquired by the signal acquiring means is a digital signal, and the distribution controlling means performs said selecting by comparing a pattern of the digital signal to the stored plurality of patterns.

10. The non-contact IC apparatus according to claim 9, wherein each of the plurality of stored patterns corresponds to a character string included in a header of a digital signal.

11. A control method in a non-contact IC apparatus comprising a plurality of IC chips, and an antenna for receiving a radio wave for non-contact IC apparatus, the method comprising:
receiving a radio wave for non-contact IC apparatus by the antenna;
acquiring a signal from the received radio wave;
selecting an IC chip to receive the signal, out of the plurality of IC chips, by comparing a pattern or waveform of the acquired signal to a plurality of stored patterns or waveforms that each correspond to a respective one of the plurality of IC chips; and
transmitting the signal to the selected IC chip.

12. The method according to claim 11, wherein the acquired signal is an analog signal, and the selecting is performed by comparing a waveform of the analog signal to the plurality of stored waveforms.

13. The method according to claim 12, wherein each of the plurality of stored waveforms corresponds to logical values indicating maximum and minimum field intensities of an analog signal.

14. The method according to claim 11, wherein the acquired signal is a digital signal, and the selecting is based on comparing a pattern of the digital signal to the plurality of stored patterns.

15. The method according to claim 14, wherein each of the plurality of stored patterns corresponds to a character string included in a header of a digital signal.

* * * * *